United States Patent
Varvarezis et al.

(10) Patent No.: US 11,616,769 B2
(45) Date of Patent: *Mar. 28, 2023

(54) RUNTIME IDENTITY CONFIRMATION FOR RESTRICTED SERVER COMMUNICATION CONTROL

(71) Applicant: Capital One Services, LLC, McLean, VA (US)

(72) Inventors: Panayiotis Varvarezis, Wilmington, DE (US); Mausam Gautam, FairFax, VA (US); Chad Alan Landis, Severna Park, MD (US); Edward Han Lee, Los Angeles, CA (US); Reza Jaberi, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 238 days.

This patent is subject to a terminal disclaimer.

(21) Appl. No.: 16/791,588

(22) Filed: Feb. 14, 2020

(65) Prior Publication Data

US 2020/0274862 A1 Aug. 27, 2020

Related U.S. Application Data

(63) Continuation of application No. 16/283,330, filed on Feb. 22, 2019, now Pat. No. 10,601,806.

(51) Int. Cl.
*H04L 9/40* (2022.01)
*G06F 21/54* (2013.01)
*H04L 9/32* (2006.01)
*H04L 9/08* (2006.01)
*H04L 9/00* (2022.01)

(52) U.S. Cl.
CPC .............. *H04L 63/08* (2013.01); *G06F 21/54* (2013.01); *H04L 9/006* (2013.01); *H04L 9/0825* (2013.01); *H04L 9/3263* (2013.01); *H04L 63/108* (2013.01)

(58) Field of Classification Search
CPC ....... H04L 63/08; H04L 9/006; H04L 9/0825; H04L 9/3263; H04L 63/108; G06F 21/54
See application file for complete search history.

(56) References Cited

U.S. PATENT DOCUMENTS

| 6,092,202 | A  | * | 7/2000 | Veil ...................... G07F 7/0866 713/153 |
| 6,854,056 | B1 | * | 2/2005 | Benantar ............... H04L 9/3263 713/168 |
| 8,719,586 | B1 | * | 5/2014 | Paleja .................... G06F 21/64 726/20 |
| 9,009,463 | B2 | * | 4/2015 | Yin ..................... H04W 12/068 713/172 |

(Continued)

OTHER PUBLICATIONS

Nurseitov, N., Paulson, M., Reynolds, R. and Izurieta, C., 2009. Comparison of JSON and XML data interchange formats: a case study. Caine, 9, pp. 157-162. (Year: 2009).*

*Primary Examiner* — James R Turchen
(74) *Attorney, Agent, or Firm* — KDB Firm PLLC

(57) ABSTRACT

The present disclosure provides computing systems and techniques for providing a certificate to sue to securely connect to a server. More particularly, the present disclosure provides a computing device certificate rotation server arranged to provide certificates to the computing device for use by an application executing on the computing device to securely connect to a server.

20 Claims, 8 Drawing Sheets

(56) References Cited

U.S. PATENT DOCUMENTS

| | | | | |
|---|---|---|---|---|
| 2002/0143989 | A1* | 10/2002 | Huitema | H04L 67/104 709/217 |
| 2002/0144119 | A1* | 10/2002 | Benantar | H04L 9/3263 713/171 |
| 2004/0168055 | A1* | 8/2004 | Lord | H04L 9/3247 713/156 |
| 2005/0228998 | A1* | 10/2005 | Chan | H04L 9/3268 713/175 |
| 2010/0077208 | A1* | 3/2010 | Appiah | G06F 21/33 713/158 |
| 2013/0057895 | A1* | 3/2013 | Okazawa | G06F 21/33 358/1.14 |
| 2014/0025954 | A1* | 1/2014 | Isozaki | H04L 63/0428 713/176 |
| 2014/0040873 | A1* | 2/2014 | Goldman | H04L 9/3263 717/168 |
| 2014/0052993 | A1* | 2/2014 | Isozaki | H04L 63/0428 713/175 |
| 2014/0281495 | A1* | 9/2014 | Um | G06F 21/44 713/155 |
| 2014/0317704 | A1* | 10/2014 | Schentrup | H04L 63/0815 726/6 |
| 2015/0052064 | A1* | 2/2015 | Karpenko | G06Q 20/3829 705/71 |
| 2015/0172146 | A1* | 6/2015 | Mahaffey | H04L 43/06 709/224 |
| 2016/0063466 | A1* | 3/2016 | Sheridan | G06Q 20/1235 705/26.25 |
| 2016/0234625 | A1* | 8/2016 | Wang | H04L 67/06 |
| 2016/0321452 | A1* | 11/2016 | Richardson | H04W 12/37 |
| 2016/0321638 | A1* | 11/2016 | Cheng | G06Q 20/20 |
| 2017/0102929 | A1* | 4/2017 | Lee | G06F 8/65 |
| 2017/0163618 | A1* | 6/2017 | Peddada | H04L 9/3236 |
| 2018/0234255 | A1* | 8/2018 | Fu | H04L 9/30 |
| 2018/0332030 | A1* | 11/2018 | Wu | H04L 9/3263 |
| 2019/0123914 | A1* | 4/2019 | Wei | H04L 9/3247 |

* cited by examiner

RUNTIME IDENTITY CONFIRMATION FOR RESTRICTED SERVER COMMUNICATION CONTROL

RELATED APPLICATION

This application is a continuation of U.S. patent application Ser. No. 16/283,330, titled "RUNTIME IDENTITY CONFIRMATION FOR RESTRICTED SERVER COMMUNICATION CONTROL" filed on Feb. 22, 2019. The contents of the aforementioned application are incorporated herein by reference in their entirety.

TECHNICAL FIELD

Examples described herein are generally related to certificates for secure communication over a network and particularly to managing rotation or replacement of certificates.

BACKGROUND

Certificates are often used to create secure connections to a server over an unsecured network, such as, the Internet. For example, certificates allow connections to a secure website via secure browsing protocols, such as, for example, hypertext transfer protocol secure (HTTPS), or the like. As another example, mobile applications can use certificates to verify the mobile application is connected to the correct server. As a specific example, a mobile banking application may use certificates to ensure that the mobile application is indeed connected to the servers associated with the mobile banking application provider.

In the mobile application example, certificates are statically incorporated into the mobile application. That is, the certificates are embedded into, or compiled with the application itself. This requires the certificate to be distributed with the application. As such, a user will need to update the application to effect a change in the certificates. Thus, whenever there is a change in the certificate, the developer or mobile application provider must update the application and redistribute the updated application. This often requires significant advance planning as well as a period of overlap where multiple certificates might need to be valid.

DETAILED DESCRIPTION

The present disclosure provides for rotation or updating of certificates, without redistribution of an application. In general, the present disclosure provides a system including an application requiring certified server access and a certificate rotation server. Upon launch of the application, a request will be made to the certificate rotation server to obtain the list of certificates deemed trusted by the application owner. With some examples, the request can be encrypted, for example, using a public key of a previously agreed upon asymmetric keypair that is distributed with the application.

The certificate rotation server can decode the request using the corresponding private key of the asymmetric keypair, validate the request and/or identify the requesting application. Upon validation of the request, the certificate rotation server can obtain the list of valid certificates for the application, sign the list of certificates using the private key, and send the signed list of certificates to the application.

The application can validate the signature of data received from the server using the previously agreed upon public key and validate the data to obtain the list of trusted certificates. Given the list of trusted certificates, the application can restrict further network-based communications to servers identified from the list of trusted certificates.

Figure 1:
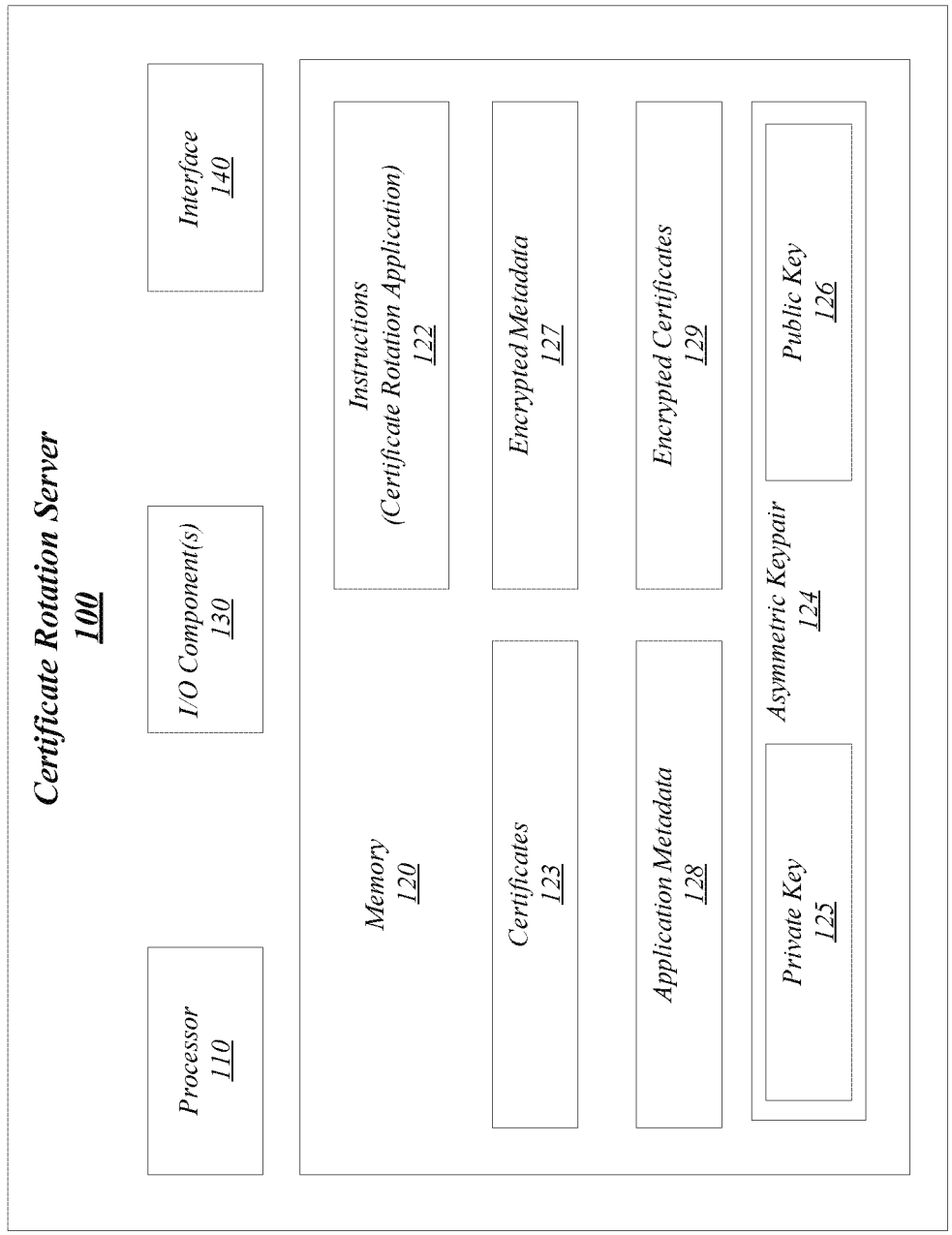
FIG. 1 illustrates an example certificate rotation server.

FIG. 1 illustrates an example certificate rotation server 100. The certificate rotation server 100 can include, at least in part, a processor 110, a memory 120, input/output (I/O) component(s) 130, and interface 140. Memory 120 may store instructions 122, which are executable by processor 110. Instructions 122 can correspond to a certificate rotation application. Memory 120 may further store certificates 123, asymmetric keypair 124 including private key 125 and public key 126, encrypted metadata 127, application metadata 128 and signed certificates 129.

Certificates 123 can be a single certificate or a list of multiple certificates. In general, certificates 123 can be used to securely connect to a server over a network, such as, the Internet. During operation, certificates 123 can be updated on certificate rotation server 100, for example, to replace an expiring certificate, to replace a compromised certificate, to change a location or other characteristics of the secured server to be connected to via the certificates 123. With some examples, the certificates 123 are secure certificates, or public key certificates provided according to any of a number of public key certificate standards, such as, for example, the X.509 standard promulgated by the International Telecommunications Union (ITU-T).

In general, asymmetric keypair 124 can be any keypair where the private key 125 is maintained privately (e.g., by the owner of the asymmetric keypair 124) and the public key 126 can be widely distributed, even publicly. With some examples, asymmetric keypair 124 can be provided according to any of a variety of cryptographic techniques. For example, asymmetric keypair 124 can be provided according to the Diffie-Hellman key exchange protocol, the digital signature standard (DSS), elliptic curve techniques, password-authenticated key agreement techniques, the Paillier cryptosystem, the RSA encryption algorithm, the Cramer-Shoup cryptosystem, or the like.

Encrypted metadata 127 can be metadata associated with an application requesting certificates 123, encrypted using public key 126 from asymmetric keypair 124. Certificate rotation server 100 can receive encrypted metadata 127 from a computing device (see FIG. 2 for example) executing an application requesting certificates 123 for use by the application. This metadata is described in greater detail below. Certificate rotation server 100 can decrypt encrypted metadata 127 using the private key 125 from asymmetric keypair 124. More specifically, processor 110 in executing instructions 122 can receive encrypted metadata 127 and can decrypt encrypted metadata 127 using private key 125. Metadata 128 can correspond to the encrypted metadata 127 decrypted using the private key 125.

Certificate rotation server 100 can validate the requesting application based on the metadata 128. More specifically, processor 110 in executing instructions 122 can validate the requesting application based on metadata 128 associated with the application. Furthermore, metadata 128 can be used to identify certificates 123 needed by the requesting application.

Certificate rotation server 100 can sign certificates 123, resulting in signed certificates 129 using private key 125 and can send the signed certificates to the requesting application. More specifically, processor 110 in executing instructions 122 can sign certificates 123 using private key 125 to generate signed certificates 129 and can send the signed certificates 129 to the computing device associated with the application requesting the certificates 123 (e.g., the application associated with metadata 128).

In some examples, processor 110, in executing instructions 122, can assemble (or package) a number of certificates 123 and any associated metadata for certificates 123 into an information element (or binary blob) and "sign" the package. That is, processor 110 in executing instructions 122 can apply a hash (e.g., Rivest-Shamir-Adleman (RSA) encryption algorithm) to the package to generate a digital signature (e.g., standard Digital Signature scheme of RSA 2048 with Secure Hash Algorithm 256 (SHA256) and Public Key Cryptography Standard (PKSC) Version 1 (PKSC1) padding, or the like). With some examples, processor 110, in executing instructions 122 can generate signed signatures 129 using a Java Script Object Notation (JSON) Web Signature. The binary blob and the signature are transmitted as signed certificates 129.

With some examples, the processor 110 may include circuitry or processor logic, such as, for example, any of a variety of commercial processors. In some examples, the processor 110 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processor 110 may include graphics processing portions and may include dedicated memory, multiple-threaded processing and/or some other parallel processing capability.

The memory 120 may include logic, a portion of which includes arrays of integrated circuits, forming non-volatile memory to persistently store data or a combination of non-volatile memory and volatile memory. It is to be appreciated, that the memory 120 may be based on any of a variety of technologies. In particular, the arrays of integrated circuits included in memory 120 may be arranged to form one or more types of memory, such as, for example, dynamic random access memory (DRAM), NAND memory, NOR memory, or the like.

The I/O component(s) 130 may include one or more components to provide input to or to provide output from the server 100. For example, the I/O component(s) 130 may be a keyboard (hardware, virtual, etc.), mouse, joystick, microphone, track pad, button, touch layers of a display, haptic feedback device, camera, microphone, speaker, or the like.

Interface 140 may include logic and/or features to support a communication interface. For example, the interface 140 may include one or more interfaces that operate according to various communication protocols or standards to communicate over direct or network communication links. Direct communications may occur via use of communication protocols or standards described in one or more industry standards (including progenies and variants). For example, the interface 140 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like.

Figure 2:
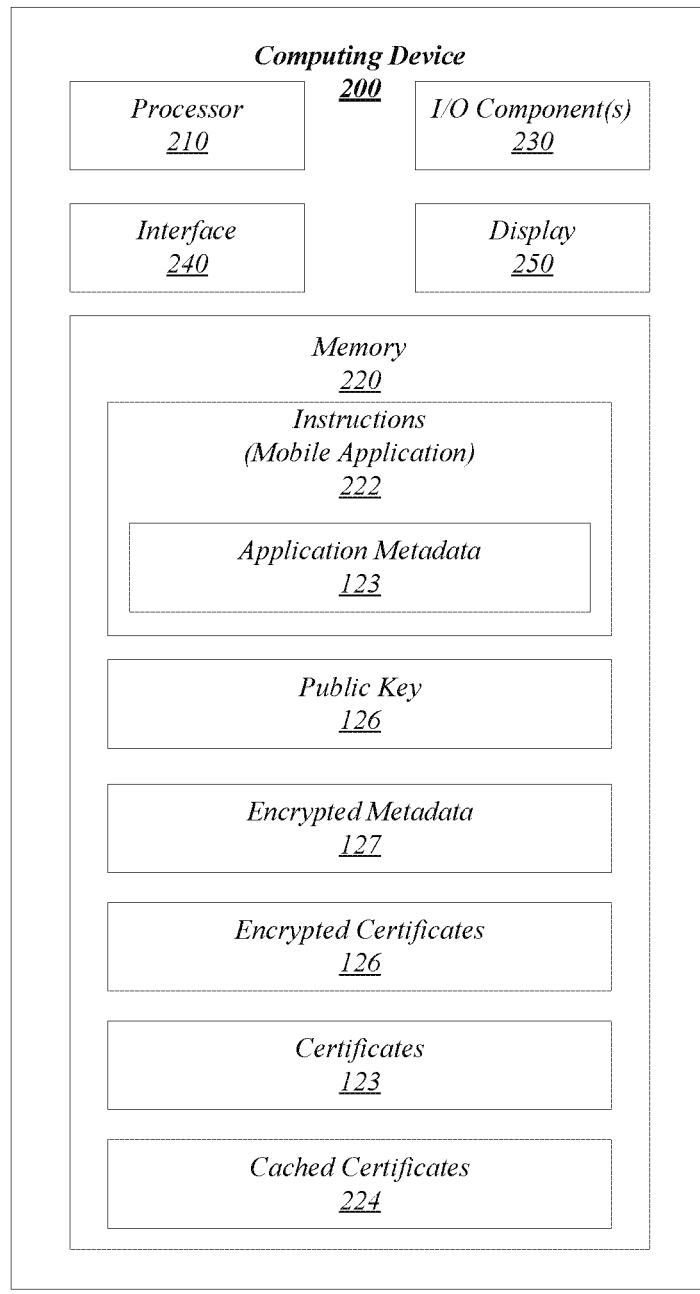
FIG. 2 illustrates an example computing device.

FIG. 2 illustrates an example computing device 200 arranged to execute an application and rotate certificates used by the application according to the present disclosure. In general, computing device 200 can be any of a variety of computing devices, such as, a smart phone, a tablet computer, a laptop computer, a desktop computer, a smart television, a streaming media device, a smart home appliance, or the like.

Computing devices 200 can include, at least in part, processor 210, memory 220, I/O components 230, interface 240, and display 250. Memory 220 may store instructions 222, which are executable by processor 210. Instructions 222 can correspond to an application to connect to a secure service using a certificate, and particularly to rotate the certificates as described herein. As a specific example, instructions 222 can correspond to a mobile banking application, for example, executed on a smart phone. Instructions 222 can include, can have associated therewith, or derivable therefrom, application metadata 123. It is noted, that although application metadata 123 is depicted included in instructions 222, in some examples, application metadata 123 can be generated by processor 210 in executing instructions 222. Memory 220 can further store public key 126 of the asymmetric keypair 124, encrypted metadata 127, signed certificates 129, certificates 123 and cached certificates 224.

In some examples, application metadata 123 can include indications of a name of the mobile application associated with instructions 222 (e.g., a package name, or the like), an identifier for the mobile application associated with instructions 222, a version number for the mobile application associated with the instructions 222, an indication of a type of connection or level of connection requested by the mobile application associated with the instructions 222.

During operation, computing devices 200 can connect to a certificate rotation server (e.g., server 100 of FIG. 1, or the like) to update cached certificates 224. Computing device 200 can use cached certificates 224 to securely connect to a server. More particularly, processor 210 in executing instructions 222 can use cached certificates 224 to securely connect to a server.

Additionally, computing device 200 can replace or update cached certificates 224 from a certificate rotation server (e.g., certificate rotation server 100 of FIG. 1). Processor 210 in executing instructions 222 can encrypt application metadata 123 using public key 126 and send encrypted metadata 127 to a certificate rotation server. With some examples, processor 210 in executing instructions 222 can send encrypted metadata 127 to a certificate rotation server along with a request to receive a list of certificates (e.g., certificates 123, or the like). Responsive to the request, computing device 200 can receive signed certificates 129. Processor 210 in executing instructions 222 can receive signed certificates 129 from the certificate rotation server. Processor 210 in executing instructions 222 can verify the signature of the signed certificates 129 using public key 126 to determine certificates 123. Processor 210 in executing instructions 222 can determine whether cached certificates 224 need to be updated based on certificates 123. If certificates 123 differ from cached certificates 224, cached certificates 224 can be updated based on certificates 123. Accordingly, instructions 222 (e.g., mobile application) can be executed using certificates that are updated without requiring redistribution of the instructions 222.

With some examples, the processor 210 may include circuitry or processor logic, such as, for example, any of a variety of commercial processors. In some examples, processor 210 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, processor 210 may include graphics processing portions and may include dedicated memory, multiple-threaded processing and/or some other parallel processing capability.

The memory 220 may include logic, a portion of which includes arrays of integrated circuits, forming non-volatile memory to persistently store data or a combination of non-volatile memory and volatile memory. It is to be appreciated, that memory 220 may be based on any of a variety of technologies. In particular, the arrays of integrated circuits included in memory 220 may be arranged to form one or more types of memory, such as, for example, dynamic random access memory (DRAM), NAND memory, NOR memory, or the like.

The I/O component(s) 230 may include one or more components to provide input to or to provide output from the computing device 200. For example, the I/O component(s) 230 may be a keyboard (hardware, virtual, etc.), mouse, joystick, microphone, track pad, button, touch layers of a display, haptic feedback device, camera, microphone, speaker, or the like.

Interface 240 may include logic and/or features to support a communication interface. For example, the interface 240 may include one or more interfaces that operate according to various communication protocols or standards to communicate over direct or network communication links. Direct communications may occur via use of communication protocols or standards described in one or more industry standards (including progenies and variants). For example, the interface 240 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like.

Display 250 can be based on any of a variety of display technologies, such as, for example, a cathode ray tube (CRT), a liquid crystal display (LCD), plasma display, light emitting diode (LED) display, or an organic light emitting diode (OLED) display. With some examples, display 250 can be a touch sensitive display. It is noted, display 250 may be external to the computing device 200, such as, for example, embodied as a computer monitor or television and coupled to the computing device 200 via any of a variety of display data interfaces.

Figure 3:
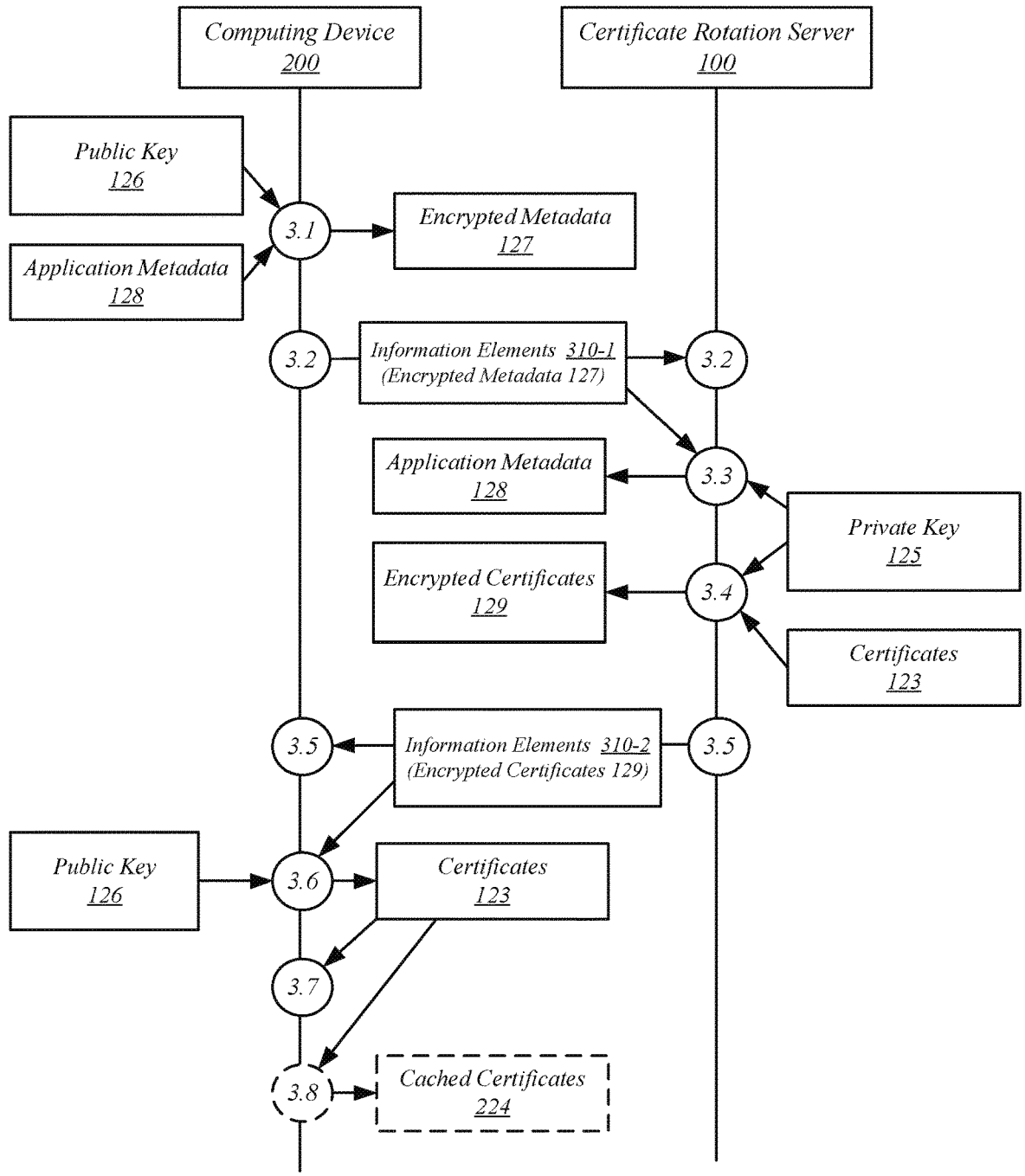
FIG. 3 illustrates an example technique to rotate a certificate.

FIG. 3 illustrates an example technique 300 to update certificates for use by an application, according to embodiments of the present disclosure. Technique 300 is described with reference to certificate rotation server 100 depicted in FIG. 1 and computing device 200 depicted in FIG. 2. However, technique 300 could be implemented by a system having a different configuration than depicted. Examples are not limited in this context.

Technique 300 can begin at circle 3.1. At circle 3.1, computing device 200 can generate encrypted metadata 127. For example, computing device 200 can generate encrypted metadata 127 associated with instructions 222 (e.g., an application package installed on computing device 200, or the like). Processor 210, in executing instructions 222, generate encrypted metadata 127 from application metadata 128 and public key 126.

Continuing to circles 3.2, computing device 200 can send an information element 310-1 to certificate rotation server 100. For example, in executing instructions 222, processor 210 can connect to certificate rotation server 100 via interface 230. At circle 3.2, certificate rotation server 100 can receive information element 310-1. For example, in executing instructions 122, processor 110 can establish a connection with computing device 200 via interface 130 and can receive information element 310-1. Information element 310-1 can include an indication of encrypted metadata 127 and a request to obtain a certificate list for connection to a secure server. With some examples, information element 310-1 can be formatted according to the javascript object notation (JSON).

Continuing to circle 3.3, certificate rotation server 100 can authenticate or validate the computing device 200, and particularly instructions 222. Said differently, certificate rotation server 100 can determine whether the application executing on computing device 200 is authorized to receive certificates 123. For example, processor 110 in executing instructions 122 can decrypt encrypted metadata 127 using private key 125 and determine whether the application associated with application metadata 128 is authorized to receive certificates 123. In some examples, at circle 3.3, processor 110 in executing instructions 122 can determine which certificates 123 to send to computing device 200.

Continuing to circle 3.4, certificate rotation server 100 can generate signed certificates 129. Processor 110, in executing instructions 122, can generate signed certificates 129 from certificates 123 and private key 125. Continuing to circles 3.5, certificate rotation server 100 can send an information element 310-2 to computing device 200. For example, in executing instructions 122, processor 110 can send, via interface 130, information element 310-2 including signed signatures 129 (e.g., certificate payload and payload signature as described above) to computing device 200. At circle 3.5, computing device 200 can receive information element 310-2. For example, in executing instructions 222, processor 210 can receive, via interface 230, information element 310-2. Information element 310-2 can include an indication of signed certificates 129. With some examples, information element 310-2 can be formatted according to the javascript object notation (JSON). As a specific example, information element 310-2 can include indications of the certificates 123 formatted as a JSON web signature (JWS) data structure. With some examples, certificates 123 can be formatted as Dir files.

Continuing to circle 3.6, computing device 200 can verify the signature of the signed certificates 129. Processor 210, in executing instructions 222, can verify the signature of the signed certificates 129 using public key 126. Continuing to circle 3.7, computing device 200 can determine whether certificates 123 match cached certificates 224. For example, processor 210 can execute instructions 222 to determine whether certificates indicated in cached certificates 224 are the same as the certificates 123.

Technique 300 can optionally include circle 3.8. For example, technique 300 can include circle 3.8 based on a determination (e.g., at circle 3.7) that cached certificates 224 does not match certificates 123. At circle 3.8, computing device 200 can update cached certificates 224 based on certificates 123. Processor 210 in executing instructions 222 can store or cache certificates 123 as cached certificates 224.

Accordingly, certificates used by an application (e.g., instructions 222) can be updated without redistribution of the application.

With some examples, computing device 200 can be arranged to implement technique 300 each time instructions 222 are executed. In other examples, computing device 200 can be arranged to implement technique 300 on a daily, weekly, monthly or other periodic basis.

Figure 4:
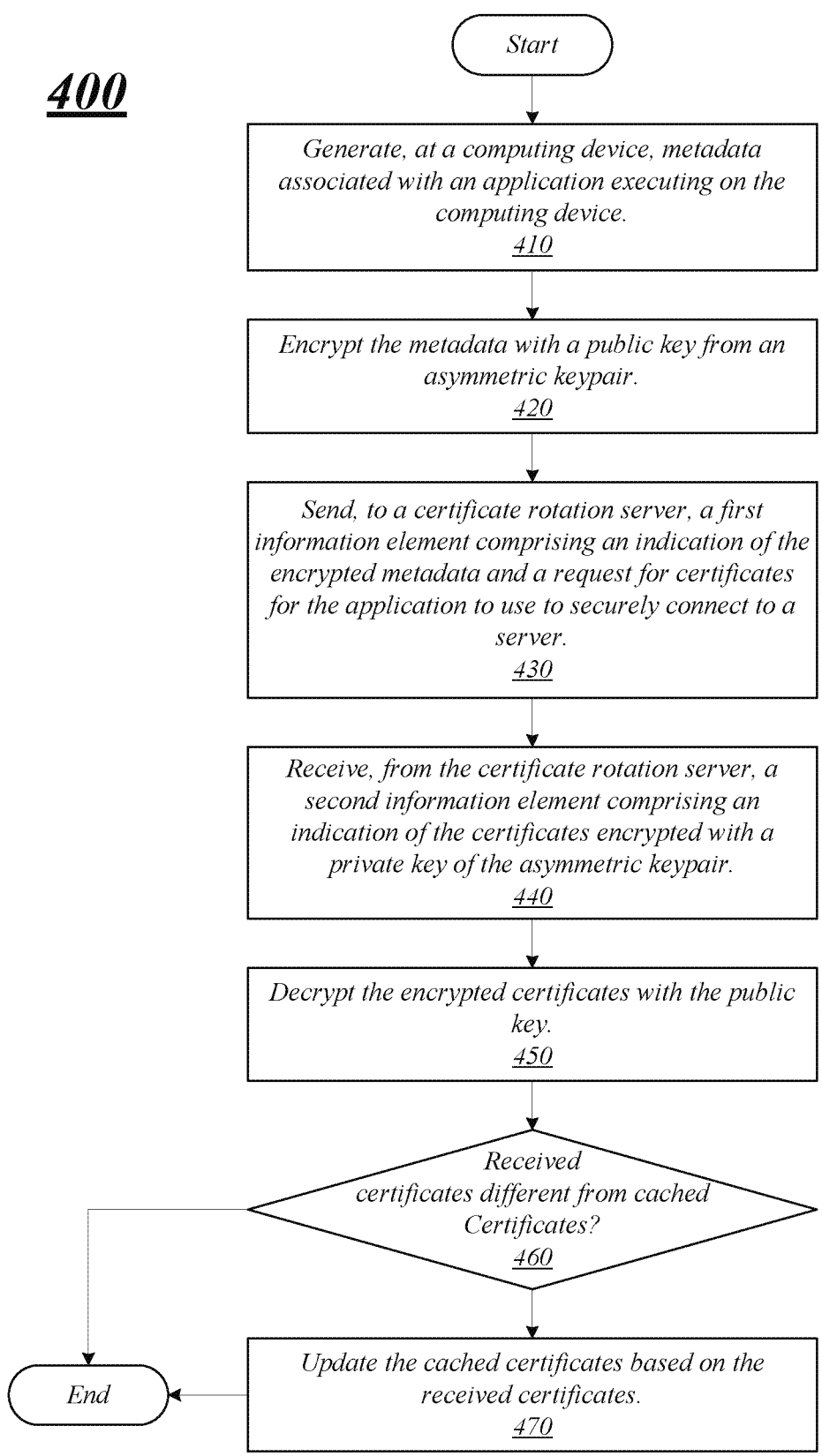
FIG. 4 illustrates a first example logic flow.

FIG. 4 illustrates a logic flow 400 to update certificates used by an application, according to embodiments of the present disclosure. A computing device, executing an application, could update certificates used by the application to connect to a secure server using logic flow 400. For example, computing device 200 of FIG. 2 can update cached certificates 224 using logic flow 400. Logic flow 400 is described with reference to certificate rotation server 100 depicted in FIG. 1 and computing device 200 depicted in FIG. 2. However, logic flow 400 could be implemented by a system having a different configuration than depicted. Examples are not limited in this context.

Logic flow 400 may begin at block 410. At block 410 "generate, at a computing device, metadata associated with an application executing on the computing device" computing device 200 can generate metadata associated with an application executing on the computing device 200. Processor 210, in executing instructions 222, can generate application metadata 128.

Continuing to block 420 "encrypt the metadata with a public key from an asymmetric keypair" computing device 200 can encrypt application metadata 128 using public key 126 from asymmetric keypair 124. For example, in executing instructions 222 processor 210 can encrypt application metadata 128 resulting in encrypted metadata 127.

Continuing to block 430 "send, to a certificate rotation server, a first information element comprising an indication of the encrypted metadata and a request for certificates for the application to use to securely connect to a server" computing device 200 can send an information element (e.g., information element 310-1) to a certificate rotation server (e.g., server 100) comprising an indication of encrypted metadata 127 and a request for certificates 123. For example, processor 210 in executing instructions 222 can send the information element.

Continuing to block 440 "receive, from the certificate rotation server, a second information element comprising an indication of the certificates and a digital signature based on a private key of the asymmetric keypair" computing device 200 can receive an information element (e.g., information element 310-2) from the certificate rotation server (e.g., server 100) comprising an indication of signed certificates 129. For example, processor 210 in executing instructions 222 can receive the information element.

Continuing to block 450 "validate the digital signature of the second information element with the public key" computing device 200 can validate the signature of second information element 310-2 (e.g., signed certificates 129) with the public key. For example, in executing instructions 222, processor 210 can validate signed certificates 129 using public key 126. Continuing to decision block 460 "received certificates different from cached certificates?" computing device 200 can determine whether the certificates received from the certificate rotation server are different from certificates cached at computing device 200. For example, processor 210 in executing instructions 222 can determine whether certificates 123 are different from cached certificates 224. Based on the determination at decision block 460, logic flow 400 can continue to block 470 or can end. Logic flow 400 can continue from decision block 460 to block 470 based on a determination that the certificates 123 do not match cached certificates 224 while logic flow 400 can end after decision block 460 based on a determination that the certificates 123 do match cached certificates 224.

At block 470 "update the cached certificates based on the received certificates" computing device 200 can update certificates cached at the computing device based on certificates received and decrypted at blocks 440 and 450. Processor 210 in executing instructions 220 can update cached certificates 224 with certificates 123.

Figure 5:
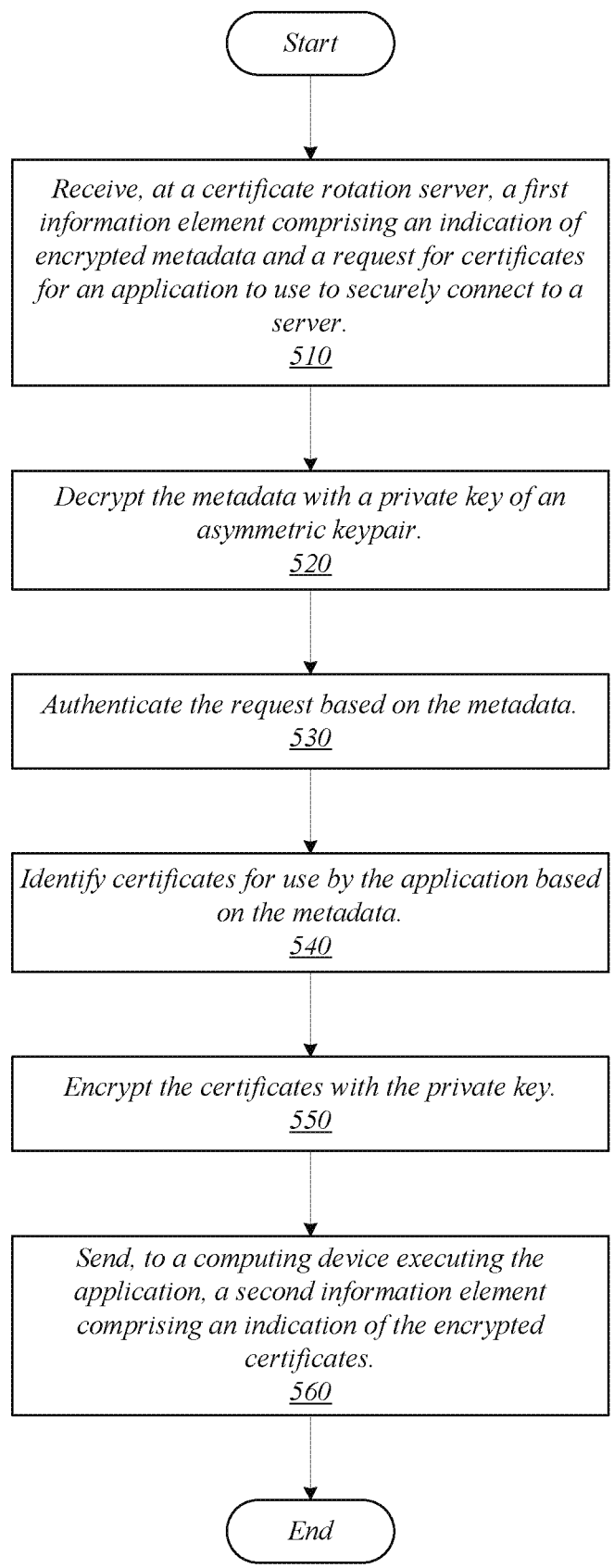
FIG. 5 illustrates a second example logic flow.

FIG. 5 illustrates a logic flow 500 to update certificates used by an application, according to embodiments of the present disclosure. A certificate rotation server, executing a certificate rotation application, could provide update certificates to a computing device to be used by an application executing on the computing device (e.g., to facilitate connecting to a secure server) using logic flow 500. For example, certificate rotation server 100 of FIG. 1 can facilitate updating cached certificates 224 at computing device 200 using logic flow 500. Logic flow 500 is described with reference to certificate rotation server 100 depicted in FIG. 1 and computing device 200 depicted in FIG. 2. However, logic flow 500 could be implemented by a system having a different configuration than depicted. Examples are not limited in this context.

Logic flow 500 may begin at block 510. At block 510 "receive, at a certificate rotation server, a first information element comprising an indication of encrypted metadata and a request for certificates for an application to use to securely connect to a server" server 100 can receive an information element (e.g., information element 310-1) from a computing device (e.g., computing device 200) comprising an indication of encrypted metadata 127 and a request for certificates 123. For example, processor 110 in executing instructions 122 can receive the information element.

Continuing to block 520 "decrypt the metadata with a private key from an asymmetric keypair" certificate rotation server 100 can decrypt the encrypted metadata 127 using private key 125 from asymmetric keypair 124. Processor 110, in executing instructions 122, can decrypt encrypted metadata 127 using private key 125. Continuing to block 530 "authenticate the request based on the metadata" certificate rotation server 100 can authenticate the request for certificates received at block 510 using the metadata decrypted at block 520. Processor 110 in executing instructions 122, can authenticate the application. For example, processor 110 can determine whether the application package type and version number are authorized to receive certificates 123.

Continuing to block 540 "identify certificates for use by the application based on the metadata" certificate rotation server 100 can determine which certificates (e.g., certificates 123, or the like) that application (e.g., application 222) is to use to securely connect to a server. Processor 110 in executing instructions 122 can determine which certificates to use based on the application metadata 128. Continuing to block 550 "sign the certificates with the private key" certificate rotation server 100 can sign certificates 123 using private key 125 from asymmetric keypair 124. For example, in executing instructions 122 processor 110 can sign certificates 123 using private key 124 resulting in signed certificates 129.

Continuing to block 560 "send, to a computing device executing the application, a second information element comprising an indication of the signed certificates" certificate rotation server 100 can send an information element (e.g., information element 310-2) to a computing device (e.g., computing device 200) comprising an indication of signed certificates 129 (e.g., a digital signature and certificates). For example, processor 110 in executing instructions 122 can send the information element 310-2.

Figure 6:
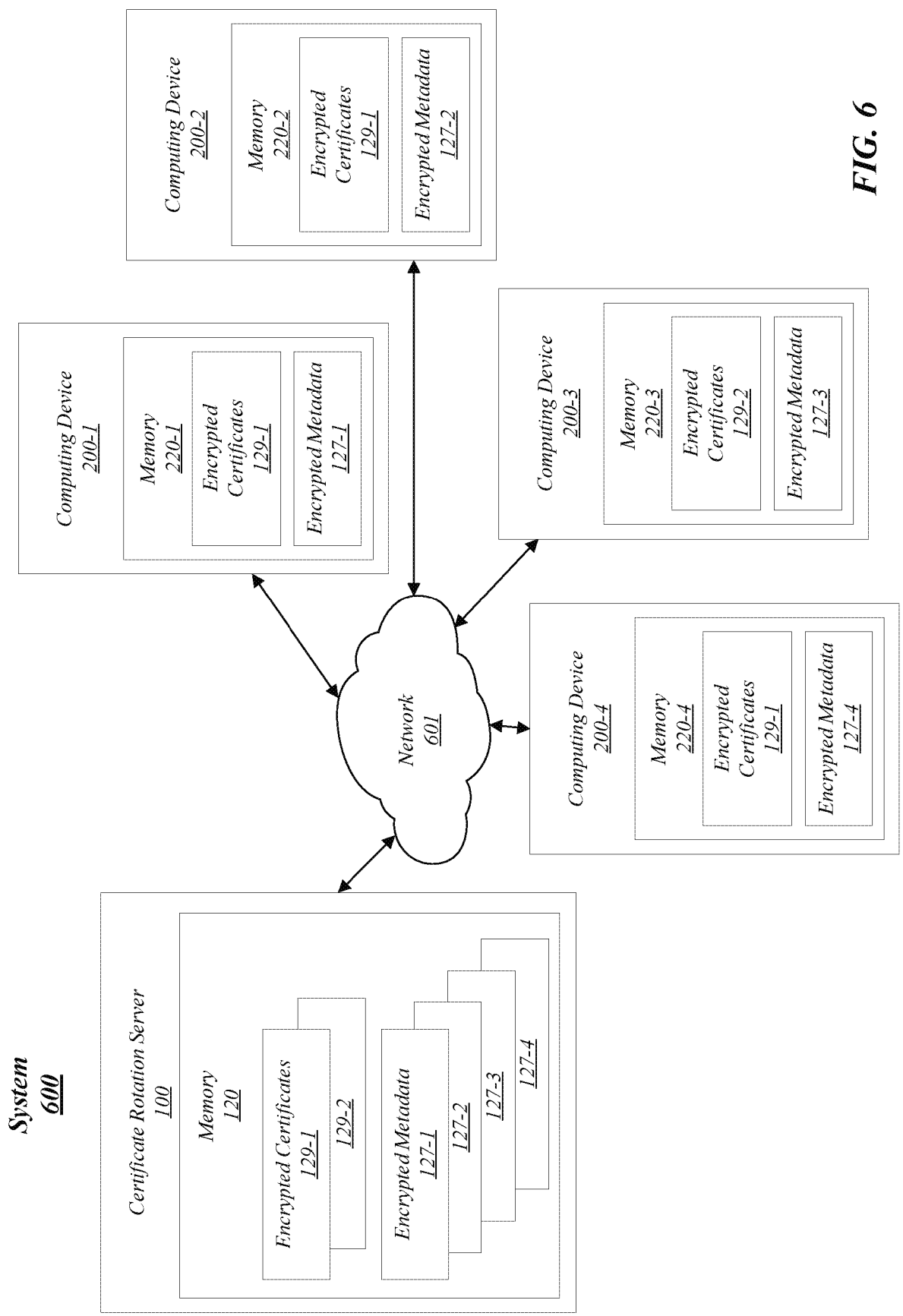
FIG. 6 illustrates an example system.

In general, certificate rotation server 100 can be used to update certificates for instructions (e.g., application packages) installed on multiple computing devices or even provide different certificates 123 to different instruction. FIG. 6 illustrates a system 600 including certificate rotation server 100 and a number of computing devices 200 coupled to the certificate rotation server via network 601. Network 601 could be, for example, a local area network (LAN), a wide area network (WAN), or a cellular network (e.g., LTE, 3GPP, or the like). In some embodiments, network 601 could include the Internet. During operation, certificate rotation server 100 can accept connections from various computing devices 200 to update certificates used by instructions (e.g., applications) on the computing devices. Likewise, computing devices 200 can connect to certificate rotation server 100 to update certificates used by instructions (e.g., applications) executing on the computing device 200.

System 600 is depicted including computing devices 200-1, 200-2, 200-3, and 200-4. It is noted that the number of computing devices 200 is given for purposes of clarity of presentation only and not to be limiting. Embodiments can be provided with more of less computing devices than depicted in this figure. Furthermore, it is noted that this figure only depicts portions of certificate rotation server 100 and computing device 200 for purposes of clarity. For example, processors and interfaces are omitted. Furthermore, a number of data structures stored in memory are also omitted. Lastly, it is noted that computing devices 200 from system 600 need not be homogenous.

Certificate rotation server 100 could be arranged to provide a number of certificates 123 to computing devices as described herein. For example, certificate rotation server 100 could provide certificates 123 to computing devices 200-1 to 200-4 such that computing devices 200-1 to 200-4 could use the certificates 123 to securely connect to a server. In some examples, certificate rotation servers 100 can be arranged to provide a selected certificate 123 based on which computing device 200 of computing devices 200-1 to 200-4 requests the certificate. For example, computing devices 200 can be arranged to execute a number of different applications (e.g., instructions 222, or the like) where each application may have an associated certificate 123. As a specific example, computing devices 200-1 to 200-4 may execute a mobile banking application or a mobile investing application. Each application may query certificate rotation server 100 to receive a list of certificates 123 as described herein. However, certificate rotation server 100 may provide a specific certificate to the computing device based on which application requests the certificate. For example, certificate rotation server 100 could provide a certificate to the mobile banking application and a different certificate to the mobile investing application. Examples are not limited in this context.

To illustrate such a system, memory 120 of certificate rotation server 100 stores first signed certificates 129-1 and second signed certificates 129-2 where first and second signed certificates 129-1 and 129-2 indicate different certificates. Memory 120 of certificate rotation server 100 also stores encrypted metadata 127-1 to 127-4, corresponding to application metadata 128 of applications (e.g., instructions 222) executing on computing devices 200-1 to 200-4, respectively. Responsive to receiving encrypted metadata 127 from a one of computing devices 200, certificate rotation server 100 can determine which certificate(s) to send to the computing device based on the metadata. For example, certificate rotation server 100 can send signed certificates 129-1 to computing devices 200-1, 200-2 and 200-4 and signed certificates 129-2 to computing device 200-3, responsive to receiving encrypted metadata 127 from the computing devices 200. Said differently, certificate rotation server 100 can determine to send a different certificate (e.g., signed certificates 129-2) to computing device 200-3 than to the other computing devices, for example, if computing device 200-3 were executing a different application from the other computing devices 200, it might require a different certificate.

Figure 7:
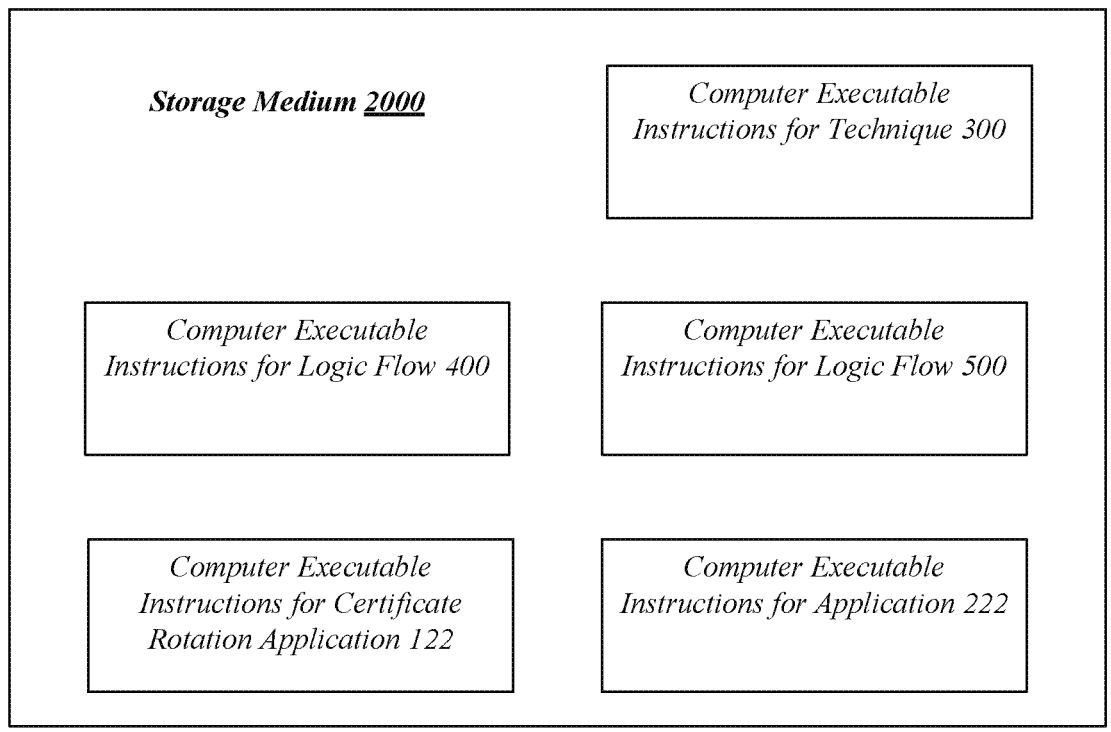
FIG. 7 illustrates an example storage medium.

FIG. 7 illustrates an embodiment of a storage medium 2000. Storage medium 2000 may comprise any non-transitory computer-readable storage medium or machine-readable storage medium, such as an optical, magnetic or semiconductor storage medium. In various embodiments, storage medium 2000 may comprise an article of manufacture. In some embodiments, storage medium 2000 may store computer-executable instructions, such as computer-executable instructions to implement one or more of techniques, logic flows, or operations described herein, such as with respect to 300, 400, and/or 500 of FIGS. 3 to 5. The storage medium 2000 may further store computer-executable instructions for the certificate rotation application 122 and/or application 222. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
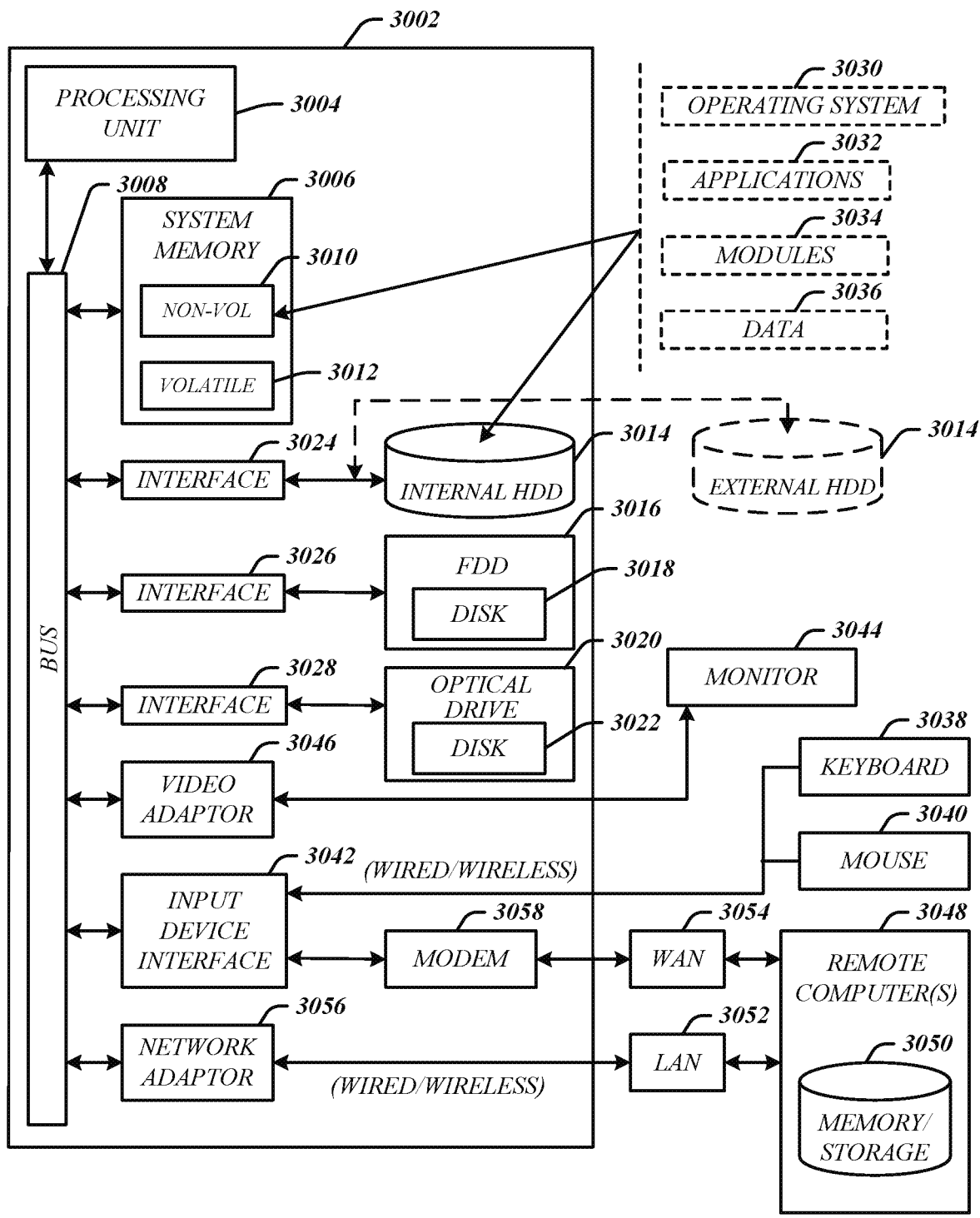
FIG. 8 illustrates an example computer architecture.

FIG. 8 illustrates an embodiment of an exemplary computing architecture 3000 that may be suitable for implementing various embodiments as previously described. In various embodiments, the computing architecture 3000 may comprise or be implemented as part of an electronic device. In some embodiments, the computing architecture 3000 may be representative, for example, of a computing device that implements one or more components of server 100. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 3000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 3000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 3000.

As shown in this figure, the computing architecture 3000 comprises a processing unit 3004, a system memory 3006 and a system bus 3008. The processing unit 3004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 3004.

The system bus 3008 provides an interface for system components including, but not limited to, the system memory 3006 to the processing unit 3004. The system bus 3008 can be any of several types of bus structure that may further interconnect to a memory bus (with or without a memory controller), a peripheral bus, and a local bus using any of a variety of commercially available bus architectures. Interface adapters may connect to the system bus 3008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 3006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in this figure, the system memory 3006 can include non-volatile memory 3010 and/or volatile memory 3012. A basic input/output system (BIOS) can be stored in the non-volatile memory 3010.

The computer 3002 may include various types of computer-readable storage media in the form of one or more lower speed memory units, including an internal (or external) hard disk drive (HDD) 3014, a magnetic floppy disk drive (FDD) 3016 to read from or write to a removable magnetic disk 3018, and an optical disk drive 3020 to read from or write to a removable optical disk 3022 (e.g., a CD-ROM or DVD). The HDD 3014, FDD 3016 and optical disk drive 3020 can be connected to the system bus 3008 by a HDD interface 3024, an FDD interface 3026 and an optical drive interface 3028, respectively. The HDD interface 3024 for external drive implementations can include at least one or both of Universal Serial Bus (USB) and IEEE interface technologies.

The drives and associated computer-readable media provide volatile and/or nonvolatile storage of data, data structures, computer-executable instructions, and so forth. For example, a number of program modules can be stored in the drives and memory units 3010, 3012, including an operating system 3030, one or more application programs 3032, other program modules 3034, and program data 3036. In one embodiment, the one or more application programs 3032, other program modules 3034, and program data 3036 can include, for example, the various applications and/or components of the wire-free charging system 100.

A user can enter commands and information into the computer 3002 through one or more wire/wireless input devices, for example, a keyboard 3038 and a pointing device, such as a mouse 3040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 3004 through an input device interface 3042 that is coupled to the system bus 3008 but can be connected by other interfaces such as a parallel port, IEEE 994 serial port, a game port, a USB port, an IR interface, and so forth.

A monitor 3044 or other type of display device is also connected to the system bus 3008 via an interface, such as a video adaptor 3046. The monitor 3044 may be internal or external to the computer 3002. In addition to the monitor 3044, a computer typically includes other peripheral output devices, such as speakers, printers, and so forth.

The computer 3002 may operate in a networked environment using logical connections via wire and/or wireless communications to one or more remote computers, such as a remote computer 3048. The remote computer 3048 can be a workstation, a server computer, a router, a personal computer, portable computer, microprocessor-based entertainment appliance, a peer device or other common network node, and typically includes many or all of the elements described relative to the computer 3002, although, for purposes of brevity, only a memory/storage device 3050 is illustrated. The logical connections depicted include wire/wireless connectivity to a local area network (LAN) 3052 and/or larger networks, for example, a wide area network (WAN) 3054. Such LAN and WAN networking environments are commonplace in offices and companies, and facilitate enterprise-wide computer networks, such as intranets, all of which may connect to a global communications network, for example, the Internet.

When used in a LAN networking environment, the computer 3002 is connected to the LAN 3052 through a wire and/or wireless communication network interface or adaptor 3056. The adaptor 3056 can facilitate wire and/or wireless communications to the LAN 3052, which may also include a wireless access point disposed thereon for communicating with the wireless functionality of the adaptor 3056.

When used in a WAN networking environment, the computer 3002 can include a modem 3058, or is connected to a communications server on the WAN 3054, or has other means for establishing communications over the WAN 3054, such as by way of the Internet. The modem 3058, which can be internal or external and a wire and/or wireless device, connects to the system bus 3008 via the input device interface 3042. In a networked environment, program modules depicted relative to the computer 3002, or portions thereof, can be stored in the remote memory/storage device 3050. It will be appreciated that the network connections shown are exemplary and other means of establishing a communications link between the computers can be used.

The computer 3002 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

What is claimed is:

1. An apparatus, comprising:
   a processor; and
   a memory coupled to the processor, the memory comprising at least one cached certificate and instructions, the instruction when executed by the processor cause the processor to:
      send, to a certificate rotation server, a request for certificates for use for an application executing on the processor to securely connect to a server, the request comprising an indication of metadata associated with the application, the metadata comprising a package name and a version number associated with the application;
      receive, based on an authentication of the application based on the package name and the version number, an information element from the certificate rotation server, the information element comprising an indication of at least one certificate;
      determine that the at least one certificate does not match the at least one cached certificate; and
      replace the at least one cached certificate with the at least one certificate based on the determination that the at least one certificate does not match the at least one cached certificate.

2. The apparatus of claim 1, the instructions when executed by the processor further cause the processor to encrypt the request with a public key of an asymmetric keypair.

3. The apparatus of claim 2, the instructions when executed by the processor further cause the processor to validate the information element with the public key.

4. The apparatus of claim 1, the instructions when executed by the processor further cause the processor to identify the metadata.

5. The apparatus of claim 4, the metadata further comprising an identifier associated with the application.

6. The apparatus of claim 1, wherein at least the request or the information element is formatted according to a JavaScript object notation.

7. At least one non-transitory machine-readable storage medium comprising instructions that when executed by a processor at a computing device, cause the processor to:
   send, to a certificate rotation server, a request for certificates for use by an application executing on the processor to securely connect to a server, the request comprising an indication of metadata associated with the application, the metadata comprising a package name and a version number associated with the application, the request to replace at least one cached certificate used by the application;
   receive, based on an authentication of the application based on the package name and the version number, an information element from the certificate rotation server, the information element comprising an indication of at least one certificate;
   determine that the at least one certificate does not match the at least one cached certificate; and
   replace the at least one cached certificate with the at least one certificate based on the determination that the at least one certificate does not match the at least one cached certificate.

8. The at least one non-transitory machine-readable storage medium of claim 7, the instructions when executed by the processor further cause the processor to encrypt the request with a public key of an asymmetric keypair.

9. The at least one non-transitory machine-readable storage medium of claim 8, the instructions when executed by the processor further cause the processor to validate the information element with the public key.

10. The at least one non-transitory machine-readable storage medium of claim 7, the instructions when executed by the processor further cause the processor to identify the metadata.

11. The at least one non-transitory machine-readable storage medium of claim 10, the metadata further comprising an identifier associated with the application.

12. The at least one non-transitory machine-readable storage medium of claim 7, wherein at least the request or the information element is formatted according to a JavaScript object notation.

13. A computer implemented method, comprising:
   sending, to a certificate rotation server, a request for certificates for use for an application to securely connect to a server, the request comprising an indication of metadata associated with the application, the metadata comprising a package name associated with the package name and a version number associated with the application, the request to replace at least one cached certificate used by the application;
   receiving, based on an authentication of the application based on the package name and the version number, an information element from the certificate rotation server, the information element comprising an indication of at least one certificate;
   determining that the at least one certificate does not match the at least one cached certificate; and
   replacing the at least one cached certificate with the at least one certificate based on the determination that the at least one certificate does not match the at least one cached certificate.

14. The method of claim 13, comprising encrypting the request with a public key of an asymmetric keypair.

15. The method of claim 14, comprising validating the information element with the public key.

16. The method of claim 13, the metadata further comprising an identifier associated with the application.

17. A system, comprising:
a non-transitory computer-readable medium comprising client instructions that when executed by a client processor at a client computing device, cause the client processor to:
send, to a certificate rotation server, a request to provide a certificate to replace at least one cached certificate for use for an application executing on the client computing device to securely connect to a server, the request comprising an indication of metadata associated with an application executable by the client processor, the metadata comprising a package name associated with the package name and a version number associated with the application,
receive, based on an authentication of the application based on the package name and the version number, an information element from the certificate rotation server, the information element comprising an indication of at least one certificate,
determine that the at least one certificate does not match the at least one cached certificate, and
replace the at least one cached certificate with the at least one certificate based on the determination that the at least one certificate does not match the at least one cached certificate; and the certificate rotation server, comprising:
a server processor, and
memory coupled to the server processor, the memory comprising server instructions that when executed by the server processor cause the server processor to:
receive, from the client computing device, the request to provide the certificate to replace the cached certificate,
determine, based in part on the package name and the version number, whether the application is authorized to receive certificates,
identify, based in part on the metadata, at least one certificate from a plurality of certificates to provide to the computing device based on a determination that the application is authorized to receive the certificates, and
send, responsive to the request, the information element to the client computing device.

18. The system of claim 17, the client instructions when executed further cause the client processor to encrypt the request with a public key of an asymmetric keypair.

19. The system of claim 18, the client instructions when executed further cause the client processor to validate the information element with the public key.

20. The system of claim 17, the metadata further comprising an identifier associated with the application.

* * * * *